United States Patent
Maletzky et al.

(10) Patent No.: US 10,249,333 B2
(45) Date of Patent: Apr. 2, 2019

(54) SINGLE RH LAYER OPTICAL FIELD ENHANCER WITH PRE-FOCUSING STRUCTURES

(71) Applicant: Headway Technologies, Inc., Milpitas, CA (US)

(72) Inventors: Tobias Maletzky, San Jose, CA (US); Matteo Staffaroni, San Ramon, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/686,471

(22) Filed: Aug. 25, 2017

(65) Prior Publication Data
US 2019/0066722 A1   Feb. 28, 2019

(51) Int. Cl.
 *G11B 5/31* (2006.01)
 *G11B 5/60* (2006.01)
 *G11B 5/00* (2006.01)

(52) U.S. Cl.
 CPC ............ *G11B 5/6082* (2013.01); *G11B 5/314* (2013.01); *G11B 5/315* (2013.01); *G11B 5/3133* (2013.01); *G11B 2005/0021* (2013.01)

(58) Field of Classification Search
 CPC .............................. G11B 5/3133; G11B 5/315
 USPC ........................................ 360/125.3, 125.31
 See application file for complete search history.

(56) References Cited

U.S. PATENT DOCUMENTS

| | | | |
|---|---|---|---|
| 6,999,384 B2 | 2/2006 | Stancil et al. | |
| 8,000,178 B2 | 8/2011 | Shimazawa et al. | |
| 8,295,132 B2 | 10/2012 | Jin et al. | |
| 8,385,160 B2 * | 2/2013 | Hara | B82Y 25/00 369/112.27 |
| 8,406,092 B2 * | 3/2013 | Tomikawa | G11B 5/1278 369/112.27 |
| 8,451,555 B2 * | 5/2013 | Seigler | G11B 5/02 360/125.01 |
| 8,488,419 B1 | 7/2013 | Jin et al. | |
| 8,599,656 B2 | 12/2013 | Jin et al. | |

(Continued)

OTHER PUBLICATIONS

Co-pending U.S. Pat. No. HT16-003, U.S. Appl. No. 15/285,721, filed Oct. 5, 2016, by Matteo Staffaroni et al., "Optical Shield System for Improved Near-Field Transducer (NFT) Performance," 35 pgs.

*Primary Examiner* — Jefferson A Evans
(74) *Attorney, Agent, or Firm* — Saile Ackerman LLC; Stephen B. Ackerman

(57) ABSTRACT

A TAMR (thermally assisted magnetic recording) write head uses weakly plasmonic materials to create plasmon near field energy. The replacement of highly plasmonic materials like Au with weakly plasmonic materials like Rh avoids the thermal deformations of softer metals like Au. To maintain the performance of the head, it includes pre-focusing structures that concentrate plasmon energy by the creation of surface plasmon polaritons which are converted to more narrowly confined plasmons by excitation by a tapered waveguide. A waveguide blocker at the distal end of the waveguide enhances the formation of surface plasmon polaritons at the interface between the blocker and the distal end of the waveguide. A pair of symmetrically disposed optical side shields are formed to either side of the pole tip and a weakly plasmonic optical field enhancer further strengthens the optical field.

23 Claims, 8 Drawing Sheets

(56) References Cited

U.S. PATENT DOCUMENTS

| | | | |
|---|---|---|---|
| 8,630,153 B1 | 1/2014 | Wang et al. | |
| 8,681,595 B1 * | 3/2014 | Huang | G02B 6/02 369/112.27 |
| 8,691,102 B1 | 4/2014 | Araki et al. | |
| 8,705,327 B2 * | 4/2014 | Matsumoto | G11B 5/1278 369/30.03 |
| 8,773,803 B2 | 7/2014 | Jin et al. | |
| 8,804,468 B2 | 8/2014 | Zhao et al. | |
| 8,953,421 B2 | 2/2015 | Peng et al. | |
| 9,019,803 B1 | 4/2015 | Jin et al. | |
| 9,025,422 B2 | 5/2015 | Aoki et al. | |
| 9,042,209 B2 | 5/2015 | Balamane et al. | |
| 9,064,515 B2 | 6/2015 | Zhao et al. | |
| 9,099,112 B1 | 8/2015 | Balamane et al. | |
| 9,129,620 B2 | 9/2015 | Cheng et al. | |
| 9,466,320 B1 | 10/2016 | Staffaroni et al. | |
| 10,121,496 B1 * | 11/2018 | Peng et al. | G11B 5/314 |
| 2011/0181979 A1 * | 7/2011 | Jin | G11B 5/314 360/59 |
| 2011/0310713 A1 * | 12/2011 | Komura | G11B 5/314 369/13.24 |
| 2012/0092971 A1 | 4/2012 | Schreck et al. | |
| 2012/0117791 A1 * | 5/2012 | Hara | G02B 6/4202 29/603.07 |
| 2012/0188859 A1 * | 7/2012 | Hara | G11B 5/314 369/13.33 |
| 2013/0272104 A1 * | 10/2013 | Gao | B82Y 10/00 369/13.33 |
| 2014/0050058 A1 * | 2/2014 | Zou | G11B 11/10534 369/13.33 |
| 2015/0255097 A1 | 9/2015 | Zhao et al. | |

\* cited by examiner

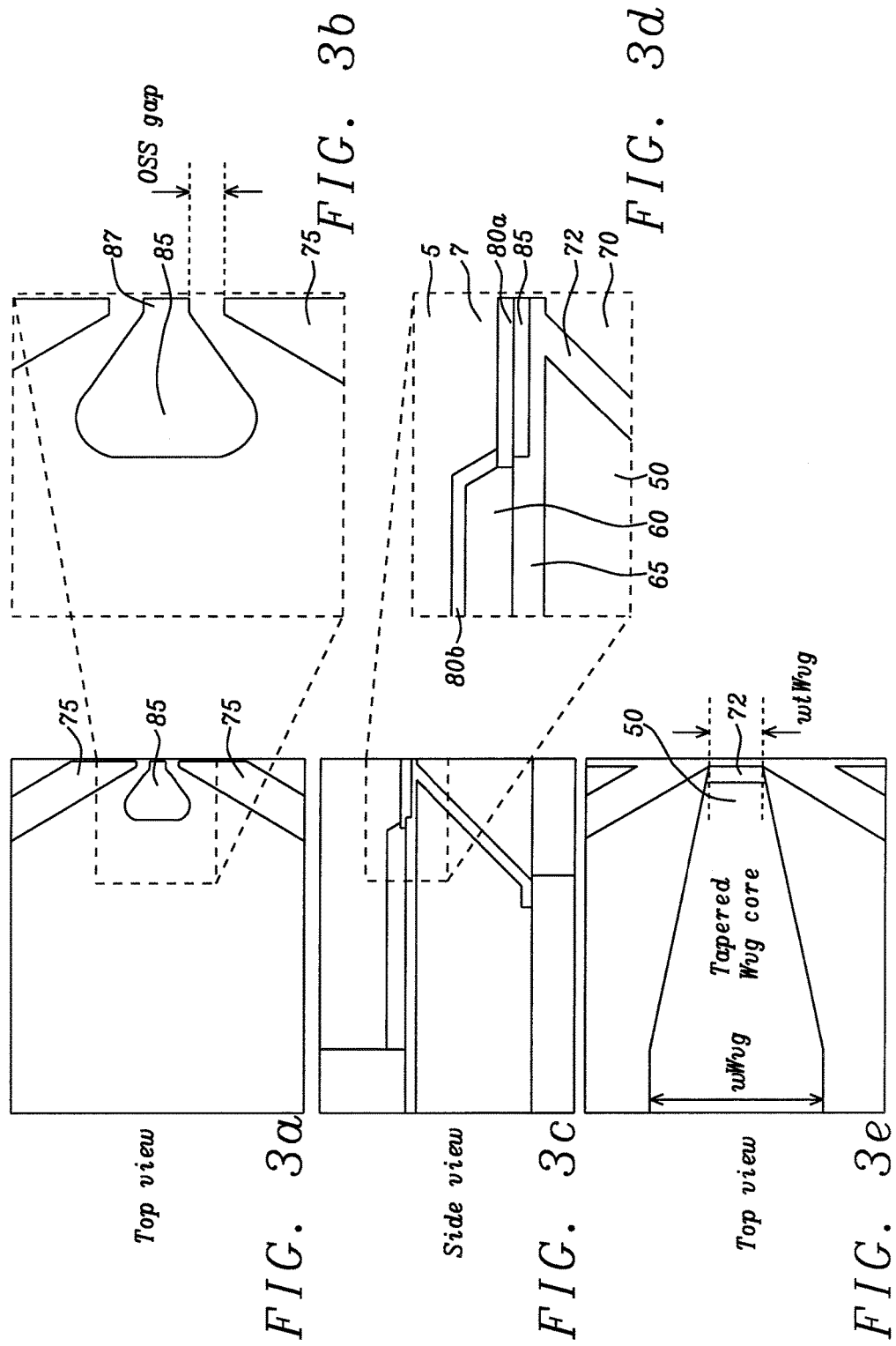

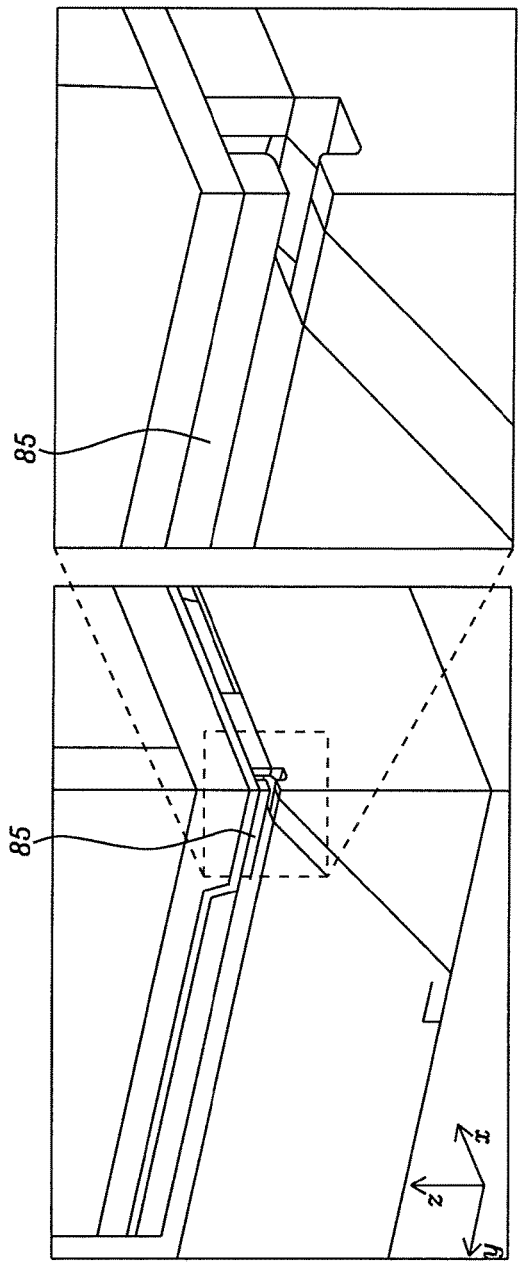
FIG. 4a
FIG. 4b
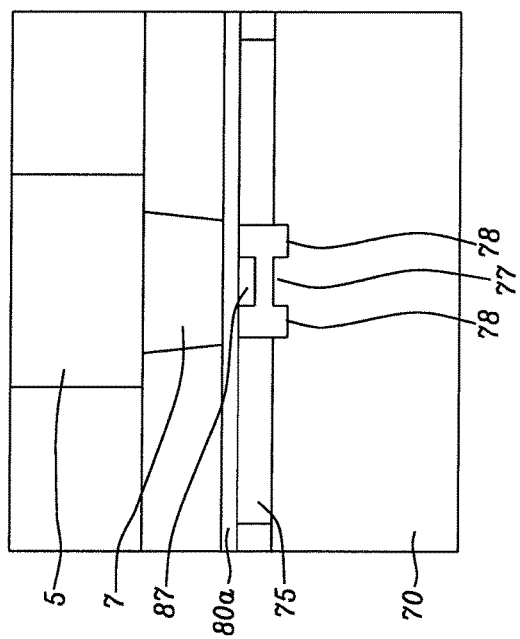
FIG. 4c

SINGLE RH LAYER OPTICAL FIELD ENHANCER WITH PRE-FOCUSING STRUCTURES

This Application is related to Ser. No. 15/235,171 Filing Date: Aug. 12, 2016 and to Ser. No. 15/011,892, Filing Date: Feb. 1, 2016, each assigned to a common assignee and incorporated herein by reference.

BACKGROUND

1. Technical Field

This disclosure relates to magnetic write heads that write on magnetic recording media, particularly to write heads that use Thermally Assisted Magnetic Recording (TAMR) enabled by the absorption of plasmon near-field energy from weakly-plasmonic structures.

2. Description

In general, a magnetic recording medium, on a microscopic level of composition, is a discontinuous body in which fine magnetic particles are assembled and held in place in a matrix. Each of these fine magnetic particles has a single magnetic-domain structure, so one recording bit is actually formed by a plurality of neighboring particles. In order to enhance the recording density, therefore, it is necessary to make the magnetic particles smaller in size so as to reduce irregularities at the boundaries of the bits. As the particles are made smaller, however, their volume decreases, so that the thermal stability of the magnetization may deteriorate. This causes a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, and thereby worsens the thermal stability. Though $K_U$ may be made greater at the same time as a measure against this problem, the increase in $K_U$ also increases the coercivity of the magnetic recording medium. However, the writing magnetic field intensity produced by a magnetic head is substantially determined by the saturated magnetic flux density of a soft magnetic material constituting a magnetic pole within the head. Therefore, there can be no writing if the coercivity exceeds a permissible value determined by the limit of writing magnetic field intensity.

One method proposed for solving such a problem affecting the thermal stability of magnetization is the so-called thermally assisted (or activated) magnetic recording (TAMR) scheme. In this approach, heat is applied locally to a magnetic recording medium immediately before applying a writing magnetic field, particularly while using a magnetic material having a large value of $K_U$. The heat then effectively lowers the medium's coercivity at the same position where the magnetic writing field is applied, so as to enable writing as though it were on a medium with generally lowered coercivity.

This approach is expected to ultimately enable recording densities at between approximately 1 and 10 Tb/inch$^2$.

TAMR can be roughly classified into magnetic dominant recording and optical dominant recording, depending on the relative effects of the magnetic field and the optical heating. In magnetic dominant recording, the writing is attributed to the localized effects of the electromagnetic coil writer, while the radiation diameter of the incident light is greater than the track width (recording width). In optical dominant recording, by contrast, the writing is attributed to the light-radiating effect, as the radiation diameter of the incident light is substantially the same as the track width (recording width). Thus, the terms "magnetic dominant recording" and "optical dominant recording" imply the effects of spatial resolution to a magnetic field or a radiation field, respectively.

In the thermally assisted magnetic head recording apparatus, a light (optical radiation) source, such as a semiconductor laser diode, is typically suggested as the source of thermal energy. Light from such a light-emitting device is introduced into an optical waveguide configured to propagate the light. As waveguide core material, TaOx or SiON is typically used. The waveguide is surrounded with cladding material, typically Al2O3, SiON or SiO2. The combination supports a travelling mode of electromagnetic radiation. The waveguide-propagated electromagnetic radiation is transferred, by electromagnetic coupling, to a plasmon generator (PG) adjacent to (above or below) the waveguide at the distal end of the waveguide. Here the waveguide excites plasmon modes in the generator. The plasmon generator is usually made of highly conductive material such as Au or Ag which is a strong plasmonic source. The optical radiation coupled by the waveguide to the plasmon generator is in turn coupled to the recording medium via plasmon near-field energy, and, thus, heats the surface of the recording media to reduce its coercivity. Since the plasmon energy is transferred to the magnetic medium from the near field of the plasmon rather than by directly focusing the optical radiation of the laser, the size of the region on the recording medium that can be effectively heated is not limited by diffraction effects of the radiation and is, therefore, much smaller than would be produced by using the optical radiation directly. It is to be noted that the PG typically terminates at its distal end with a small protruding "peg," whose role is to further concentrate the plasmon energy at the sharpest possibly defined spot on the recording media.

One big challenge in Thermally Assisted Magnetic Recording (TAMR) is to improve the lifetime of the recording heads while maintaining performance and low laser power requirements. Good plasmonic metals (Au, Cu, Ag) are commonly used to confine the light-generated plasmonic energy in subwavelength optical spots while providing low optical loss. Their large number of free electrons, which is the reason for their good plasmonic properties, also makes them soft and prone to deformation, especially at TAMR head operational temperatures.

To improve the lifetime of the TAMR recording heads it is important to remove those soft metals from areas with critical dimensions and replace them by more rigid materials. In general, these materials show poorer plasmonic behavior (the ability to excite and maintain plasmon modes), which leads in many cases to higher required laser power and a resultant higher head temperature.

Prior art Rh based designs show a better lifetime than the Au based designs, but their power requirement is higher and the embedded Au structures still show deformation. This deformation increases the power requirement even more until the heads fail.

The prior art teaches a number of approaches that recognize the need to protect the recording head from excessive heat generated, for example, by loosely coupled optical radiation from the waveguide. Examples are found in Headway application Ser. No. 15/235,171, "Plasmon Generator with metallic waveguide blocker for TAMR", Headway application Ser. No. 15/011,892, "Self-aligned hybrid Au—Rh near field transducer for enhanced reliability" and Headway application Ser No. 15/285,721 Optical shield system for improved NFT performance". The preceding Headway dockets are fully incorporated herein by reference. Also, related, is X. Jin et al., U.S. Pat. No. 8,599,656 B2 and K. Shimazawa and K. Tanaka, U.S. Pat. No. 8,000,178 B2, and Balamane et al., U.S. Pat. No. 9,042,209 B2. These prior art teachings are also fully incorporated herein by reference.

However, none of the above references deal with the particular problem to be addressed herein nor can their teachings be applied to that problem in the manner to be applied herein.

SUMMARY

A first object of this disclosure is to provide a side-shielded and waveguide-blocked TAMR write head that uses optically generated plasmon near-field energy provided by relatively weak plasmon sources for the thermal activation of a magnetic recording medium, yet achieve high efficiency without using head elements that are strongly plasmonic, but soft, and would deform and recede from the ABS as a result of excessive heat being applied to them.

A second object of this disclosure is to provide such a side-shielded and waveguide-blocked TAMR head whose performance is at least comparable to prior art TAMR heads yet does not require a soft Au layer (or other soft, strongly plasmonic layer) with small patterned features, as an element of the system for focusing optical power and, therefore, is easily subject to recession and thermal deformation.

A third object of this disclosure is to provide such an optically side-shielded and waveguide-blocked TAMR head where reduced losses in the slightly less-plasmonic structures are compensated by providing an initial level of pre-focusing using larger scale dielectric and plasmonic structures.

A fourth object of this disclosure is to provide a method for pre-focusing light energy (i.e., electromagnetic radiation) in a waveguide by coupling that light to plasmon energy as surface plasmon polaritons (SPP) in a strongly plasmonic stratified layer recessed from the ABS and direct that energy at less plasmonic elements, including a waveguide blocker and side shields formed of less plasmonic materials and smaller, less plasmonic layers that includes an optical field enhancing layer.

A fifth object of this disclosure is to achieve the previous objects while still operating within the bounds of current fabrication methods and practices used in related devices.

The above objects will be met by a design that is shown, schematically, in a series of 3-dimensional (3D) views in FIGS. 1a, 1b and 1c. These views are oriented to partially display both a side cross-sectional view and an ABS view and the sequence has various covering elements removed to display inner structure more clearly. A set of x,y,z axes are shown for convenience and to clarify the description. Note that the term "distal" will refer to that portion of an element closest to the ABS, and the term "proximal" will refer to that portion further away in the y-direction.

The side view is through a side cross-sectional symmetry plane (y,z plane) sliced through the center line (along the y direction) of the write head. FIG. 1(a) already shows all the important elements of the presently disclosed design, including a main pole (MP), that is formed of an upper pole piece (or yoke), 5, of magnetic material having 19 kG saturation magnetization and a tapered (in the x,y plane) main pole piece, 7, having 24 kG saturation magnetization. A Ru "wing" 18 serves as a heat sink and is formed to each side of the main pole piece.

A tapered (in the x,y plane) waveguide core (WVG) 50, is aligned in the y-direction below the pole, 7 and will be shown more clearly in FIG. 3e. The WVG core is here shown made of TaOx, but other dielectric materials are possible. A stratified Au layer (called here a "recessed wing") 60 is formed in the x,y plane over the waveguide core and is recessed from the ABS. The Au layer is separated from the WVG by a dielectric layer 65, here a layer of $SiO_2$, that serves as a core cladding material. The Au layer is also separated from the main pole piece 7 by a layer 80b of weakly plasmonic material (here Rh). The waveguide core terminates in a downward sloping face 11 over which is formed a dielectric layer 72 of $SiO_2$. A waveguide blocker (WGB) 70, abuts the face 11 in a complementary sloping fashion and is separated from it by the dielectric layer 72 which is of constant thickness. The dielectric layer has a lower index of refraction than the waveguide core (typically TaOx for the core, $SiO_2$ for the layer) so that the waveguide can support optical modes without significant losses. The waveguide blocker is also formed of a weak plasmonic material, here shown as Rh, but other weakly plasmonic materials, like Ir, Pt and Pd and their composites are acceptable. Two layers, upper layer 80a and lower layer 85, formed of weakly plasmonic materials, here shown as Rh, are formed between the distal edge of the Au layer 60 and the ABS and recess layer 60 from the ABS. The distal edge of layer 80b terminates on the proximal end of layer 80a and the distal end of Au layer 60 also terminates at the proximal end of layer 80a. The distal end of the upper layer 80a will transmit near-field plasmon energy from surface plasmons formed along its surface, to the recording medium. In addition, the entire layer, 80a and 80b, can act as a diffusion barrier between the recessed Au wing 60 and the magnetic material 7 of the tapered main pole. The lower layer 85 is denoted an optical field enhancer (OFE), which will strengthen the optical field distribution created by the plasmon modes in the upper layer 80a, the WGB 70 and the optical side shields 75. A small "peg" 87 extends from the ABS end of the OFE and further focuses the plasmon energy onto the recording medium. We will show in FIG. 2a that the prior art needed only a recessing layer ((8) in FIG. 2a) formed of dielectric material, but the present design requires a weakly plasmonic layer to provide plasmon modes that supply the additional plasmonic energy that is missing.

In the prior art, a strong plasmonic layer, like Au layer 60, would extend up to the ABS and deliver plasmon near-field energy to the recording medium. However, as was noted above, such a layer, while highly efficient in providing energy, would be soft and subject to thermal deformation and recession. In the present case, the strongly plasmonic layer 60 terminates well before the ABS and the mechanically strong, but weakly plasmonic layers 80a and 85 support the weaker plasmon modes.

Finally, one of a pair of optical side shields (OSS) 75, here formed of weakly plasmonic Rh and denoted "OSS (Rh)" in the figure, is shown where its ABS face emerges at the ABS. We note again that the two layers, 80a and 85, the waveguide blocker 70, and the optical side shields 75 are all formed of the weakly plasmonic material Rh, but other such weakly plasmonic materials (noted above) are acceptable. Therefore, no strongly plasmonic materials that are soft and thermally deformable appear at the ABS.

Referring to FIG. 1b there is shown, for the sake of clarity, the structure of FIG. 1(a) with the 19 kG (kilo Gauss) main pole yoke (5 in FIG. 1a) removed. The removal shows more clearly the tapered main pole 7 and the Ru "wing" 18 that serves as a heat sink layer and is here denoted as such, contacting the lateral side of the main pole. The other elements that are not revealed in this figure are the same as in FIG. 1a and are not further identified.

Referring next to FIG. 1c, there is shown the structure in FIG. 1b with the additional removal of the 24 kG tapered main pole tip (7 in FIG. 1b), the OFE layer (85 in FIG. 1a), a central portion of the recessed Au wing (60 in FIG. 1a) along with a similar portion of layers 80a and 80b and a portion of the Ru heat sink layer 18 contacting layers 80a and 80b and also protecting the recessed Au wing 60. The removal of these elements shows more clearly a portion of the OSS (optical side shields, 75 in FIG. 1a).

A more detailed planar side view of the structure in FIG. 1a is shown as FIG. 2b, while in FIG. 2a there is shown a comparison side view of exemplary prior art such as that which is essentially taught by X. Jin et al., (U.S. Pat. No. 8,599,656).

FIG. 2a of the prior art shows a large Au layer 160 denoted an "Au wing" that acts as a heat sink and is separated from the main pole tip 7 by a Ru barrier layer 155. Beneath the Au wing 160 is a bi-layered structure comprising a patterned Rh layer 165 formed above a patterned Au layer 178. The Au layer 178 is a strong source of plasmons while the Rh layer 165 above it provides a degree of structural stability to the Au layer. The Au layer 178 extends almost to the ABS and is subject to thermal deformations and recessions, which the present design seeks to eliminate. FIG. 2a also shows a waveguide blocker (WGB) 170 formed of Ru. The waveguide blocker in the present design shown in FIGS. 2b and 2c is formed of Rh, which, while weakly plasmonic will serve a plasmon enhancing purpose.

FIG. 2b schematically shows a side view and FIG. 2c schematically shows an ABS planar view, both of the 3D drawing of FIG. 1. Both figures schematically show how the present design differs from the prior art of FIG. 2a.

FIG. 2b shows two small Rh layers, 80a and 85, comprising a patterned Rh layer 85 close to the ABS and another Rh layer, 80a, directly above 85. A stratified Au layer, 60, extends rearward (in the y-direction) away from 80a and 85. Although layer "80", which is what we will call the combination of 80a plus 80b, can be created in a single deposition step, only its distal portion 80a takes part in the optical plasmon excitation, while its proximal part 80b serves as a diffusion barrier. The distal edge of the Au wing, 60, contacts the proximal edge of upper Rh layer 80. An important difference between the prior art of FIG. 2a and the new design as shown in FIG. 2b is the absence, in FIG. 2b, of a patterned Au layer 178 below the Rh layer 165 in the prior art of FIG. 2a. That patterned Au layer 178 is mainly responsible for focusing the optical power (through the plasmon near field) in the peg region and onto the recording medium, but its thermal deformation can alter the head performance and power requirement. This strongly plasmonic, but deformable, Au layer is not necessary in the new design for achieving high efficiency, so FIG. 2b shows a Rh layer 80a, and a small patterned Rh layer 85 beneath it, but there is no Au layer beneath them. The Au layer is now a single layer (60 in FIG. 2b) that is recessed from the ABS and receives no thermal energy to cause deformations. Therefore, better lifetime is expected for the new design with comparable performance.

However, by eliminating the Au layer of the prior art, we have eliminated a strong plasmonic source. We will now discuss a "pre-focusing" method that is implemented in the present design in FIGS. 2b and 2c by which the loss of the strongly plasmonic Au source of prior art FIG. 2(a) is compensated by a much weaker plasmonic Rh source. To do so, it will be necessary to "pre-focus" the laser light in the waveguide on the smaller and weaker plasmonic sources (e.g., Rh layers 80a and 85), by using a set of larger dielectric and plasmonic metal structures.

BRIEF DESCRIPTION OF THE DRAWINGS

FIGS. 3a and 3b schematically show the present design: in (a) a top view of a planar cross-section in the x-y plane at the level of the OFE, showing the OFE, the peg and the OSS. In 3b there is shown an enlarged view of a boxed section of 3a.

FIGS. 3c and 3d schematically show the present design: in (c) a side view in the y-z plane and in (d) an enlarged view of a boxed section of 3c.

FIG. 3e schematically shows schematically a top view in the x-y plane at the level of the waveguide core showing its tapered shape.

FIG. 4a is a portion of a 3-dimensional illustration of an additional embodiment of the present device where a ridge is created in the WGB by etching notches in the WGB.

FIG. 4b is a magnification of FIG. 4a.

FIG. 4c is a planar ABS view of 4a.

DETAILED DESCRIPTION

Figure 1A:
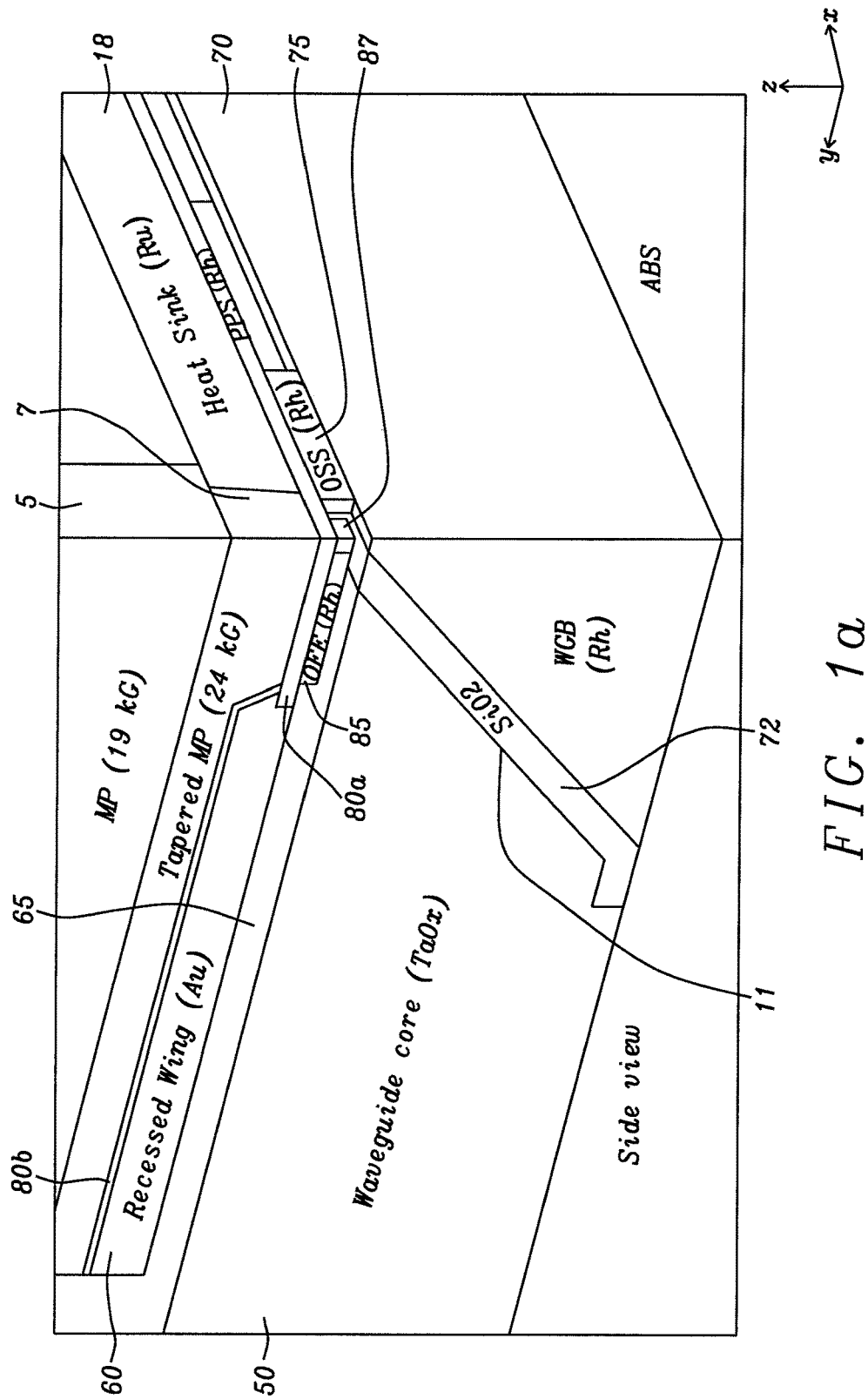
FIG. 1a is a schematic 3D (3-dimensional) view of the new TAMR design, oriented so that the side and ABS views are presented.
Figure 1B:
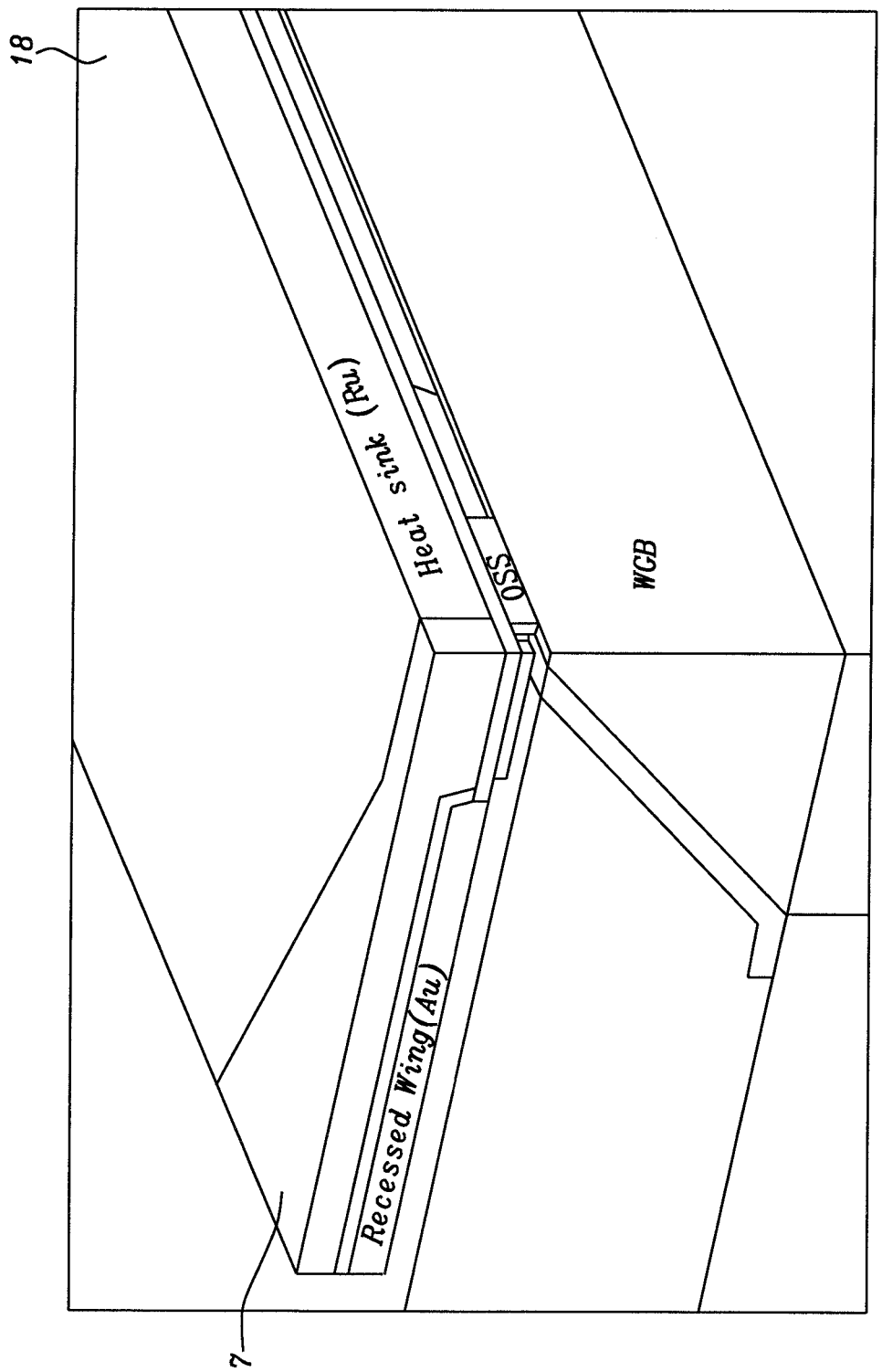
FIG. 1b shows the design of FIG. 1a but the main pole yoke is removed to reveal the structures beneath it.
Figure 1C:
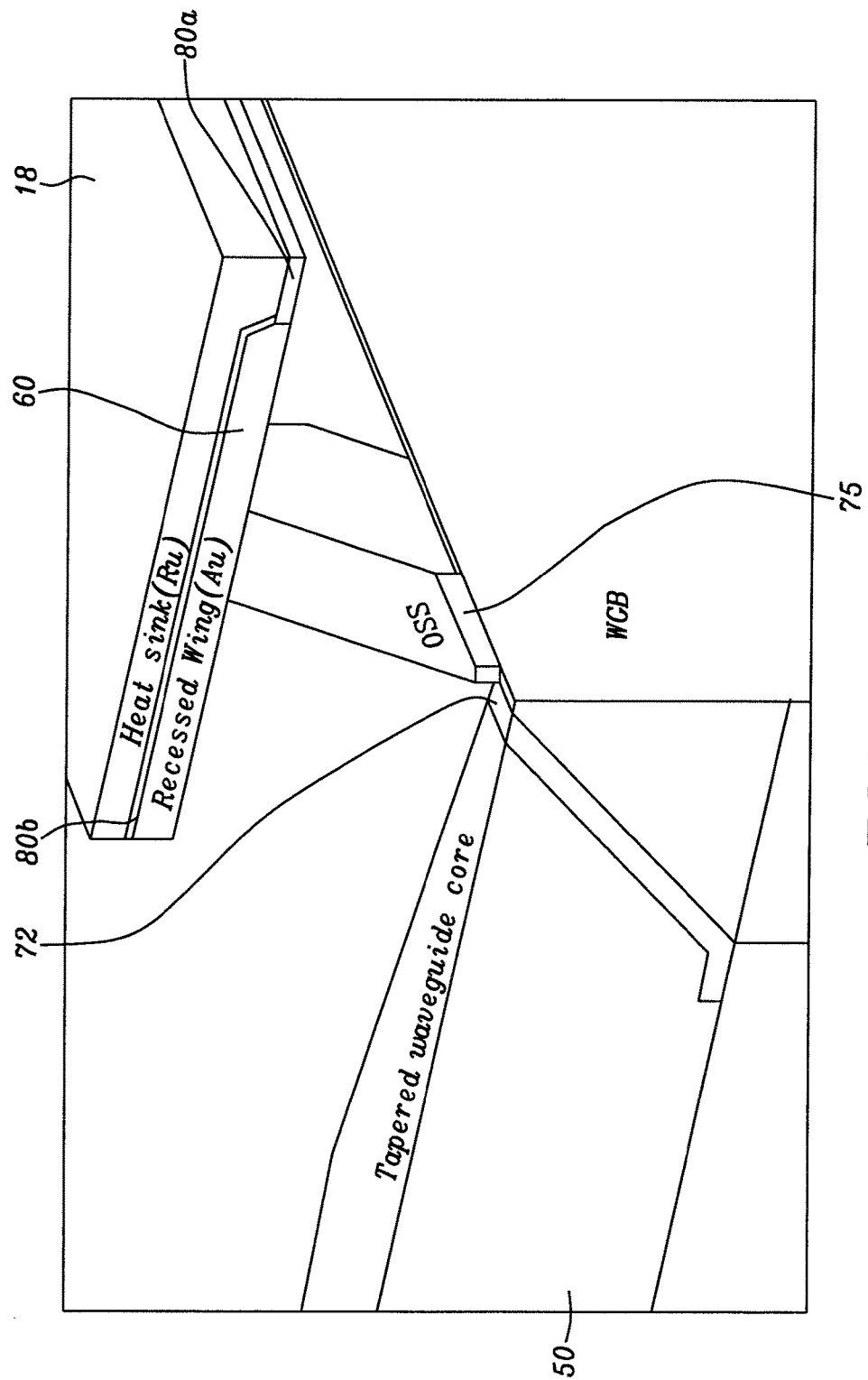
FIG. 1c shows the structure in FIG. 1b with the additional removal of the main pole, the OFE, part of the recessed Au wing, part of layers 80a and 80b and the Ru heat sink and protection layer.
Figure 2A:
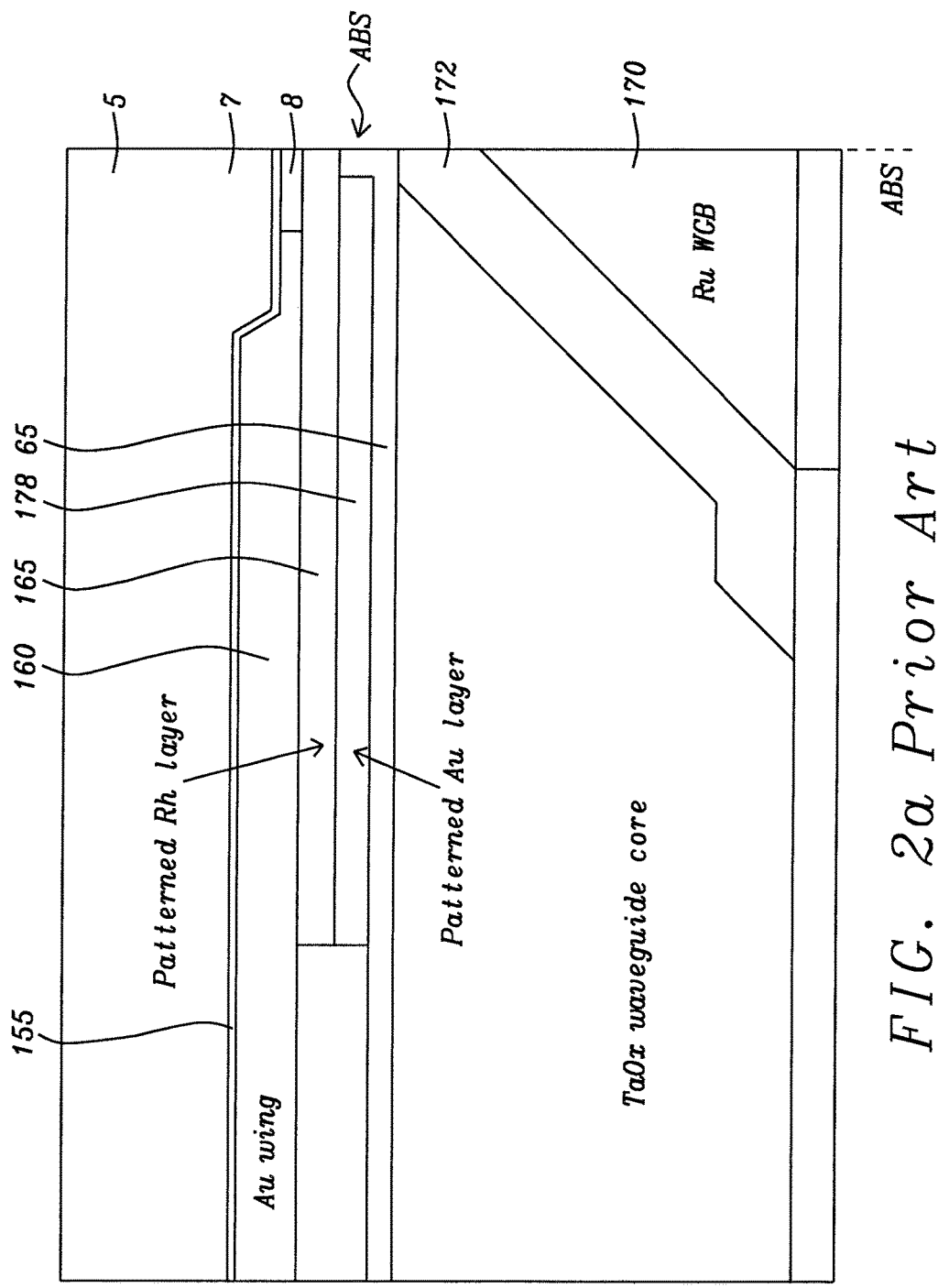
FIG. 2a is a schematic illustration of a side view of a prior art TAMR writer.
Figures 2B, 2C:
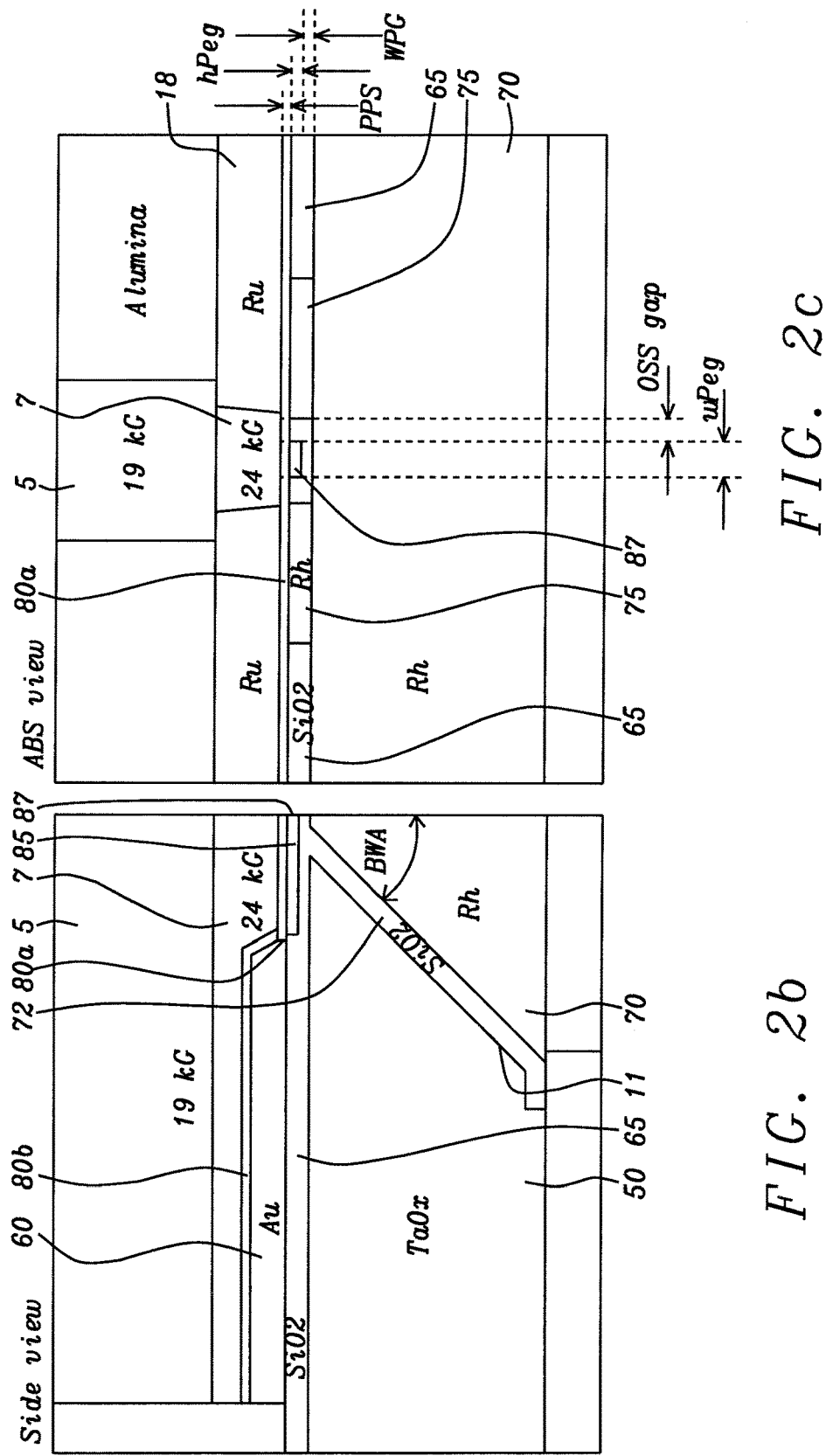
FIG. 2b shows, schematically, a side view of the present design.
FIG. 2c shows schematically an ABS view of the present design.

To reduce the losses in the small, only slightly plasmonic structures at the ABS of the present TAMR design, it is necessary to pre-focus the incident laser light using larger scale dielectric (waveguide) and plasmonic metal structures (waveguide blocker and optical side shields). This pre-focusing is done using the structures shown schematically in FIG. 2b and FIG. 2c and in FIG. 3a and FIG. 3b. We separately describe four pre-focusing mechanisms and the elements that produce them in paragraphs 1-4 below:

1. A stratified (i.e., flat and unpatterned) Au film 60 (denoted "recessed wing") is above the waveguide core 50 and is separated from the core by a dielectric layer 65, here an SiO2 layer, as shown in FIG. 2b. The optical power from the optical modes excited within the waveguide core by an optical laser (not described) is transferred into a surface plasmon polariton (SPP) on the Au—SiO$_2$ interface (60-65 interface) by mode-beating of the in-phase and anti-phase eigenmodes of the waveguide-Au film hybrid system. This leads to a better confinement in down-track (DT) direction (here, the −y direction) at the dielectric-metal interface close to the magnetic write pole 7. Note the Au film 60 is large and unpatterned (i.e., stratified) and does not taper to a narrow ABS end. Further, it is recessed away from the ABS and separated from the ABS by the Ru heat sink (see 18 in FIG. 1*c*) and the Rh layer (80*a* in FIG. 1*c*) which is approximately 200 nm in depth (y-direction) away from the ABS. Layer 85 also separates the Au layer from the ABS by an equal amount as shown in FIG. 3*d*. As a result of this separation/recess from the ABS, this Au film does not suffer the thermal deformations of the Au plasmon generators of the prior art (see, for example, 178 in FIG. 2(*a*)). Note also in FIG. 3*d* the position of the pair of layers 80*a*, 85, between the distal end of 60 and the ABS. The upper layer 80*a* is positioned between the tapered main pole 7 and the $SiO_2$ dielectric layer 65. The proximal edge of the upper layer 80*a* contacts the distal edge of 60 and transfers plasmon energy from the Au layer to the peg of 85 at the ABS (the peg is shown as 87 in FIGS. 1*a* and 3*b*). The lower layer 85 is the "optical field enhancer" (OFE) which is shaped in accord with the plasmon field and enhances the plasmon field energy at the ABS.

2. A tapered (in the x-y plane) waveguide (WVG) core, 50 is shown in side view in FIG. 2*b* and also in the top view of FIG. 3*e*. The tapering is in the x-y plane and the WVG is of maximum width at its proximal end and minimum width at its distal end. At the Au—$SiO_2$ interface 60/65 an excited SPP mode is transferred by adiabatic mode conversion into a more confined mode in cross track, x-direction. We note that for efficient excitation of the SPP mode the waveguide should provide an optical mode that has the same polarization characteristics as the SPP mode. Therefore, the surface structures of the plasmon near field transducer (i.e., layers 80*a* and 85) will define a polarization direction that the waveguide mode should preferably match. A waveguide blocker (WGB), shown as 70 in FIGS. 2*b* and 5*a*, with low refractive index dielectric spacer 72 (here SiO2), is shown in FIG. 2(*b*). This WGB element is similar to what is described in Chou et al., in Headway application, Ser. No. 15/235,171, where it is formed of a poor plasmonic (but conducting) material and its function is to reflect loosely coupled radiation away from the ABS. In the present design, however, the WGB is now formed of weakly plasmonic Rh instead of poorly plasmonic Ru and its role in the present design is to assist in achieving the pre-focusing effect. Since the power transfer between an SPP on a stratified Au film (60 in FIG. 2*b*) and the channel waveguide mode is not perfect, there is uncoupled light in the TaOx waveguide core. This light is now exciting an SPP mode on the sloped Rh—SiO2 interface 70/72 between the WGB 70 and the dielectric layer over the distal end of the waveguide core 72. It also strengthens an SPP mode at the interface between Rh layer 80 and the SiO2 layer 65 along the top of the waveguide. In addition, light from the waveguide which does not couple to any SPP is blocked by the WGB. While the latter blocking function of the WGB is already utilized in Chou et al., now it is the more important SPP excitations at the interface that are essential for the present design. Therefore, the WGB of the present design has to be made out of an at least mildly plasmonic material like Rh or Ir. In Chou, however, this SPP excitation in the WGB interface was not desired, since it would create a second hot spot in the recording layer in addition to the main recording spot at the top edge of the peg. Therefore, a non-(or poorly)-plasmonic material like Ru was preferred for the WGB by Chou. For utilizing the SPP excitation in the design presented here, it is important that the optical field is confined at the top of the distal edge of the WGB to excite the desirable SPPs. This leads to the replacement of the dielectric PPS layer between the 24 kG write pole (7 in FIG. 2*c*) by the Rh Optical Field Enhancer 85 as shown in either FIG. 1*a* or the ABS view in FIG. 2*c* or FIG. 3*a*. Even without the OFE, plasmon energy is already concentrated at the angle tip by the combination of plasmon energy in the horizontal Rh single layer 80*a* and angled interface with the waveguide blocker. Addition of the OFE, discussed below, will enhance the effect.

3. Optical Side Shields (OSS), shown as 75 in FIG. 3*b*, are similar to what is taught in Headway application Ser. No. 15/285,721, but are now used for a different purpose and made of different material. In the prior art the OSS are used to clean up stray light. Therefore, strong SPP excitation is unwanted and is suppressed by choosing non-plasmonic metals like Ru for the OSS. In the present design, unlike in the prior art, the OSS are part of the pre-focusing structure, even though they are not as strongly excited as the WGB. Therefore, at least a mildly plasmonic material like Rh is preferred for them. Referring to schematic FIG. 3*a* and associated schematic FIG. 3*b*, there is shown a top view (magnified in 3*b*) in an x-y plane cross-section through the OFE (85). The shape of the OFE approximates the shape of the optically generated field in that region. The distal end (87) of the OFE (85) is the peg.

Experiment indicates that the size of the optical spot gets smaller due to focusing, not as a result of absorption. After achieving sufficiently narrow confinement of the optical power by using the large structures described above (i.e., the waveguide, the waveguide blocker and the optical side shields), the Optical Field Enhancer (OFE) is immersed into the field distribution (85 in FIG. 3*d*). This metallic, weakly plasmonic structure, positioned beneath layer 80*a* in FIG. 3*d* is shaped according to the optically generated field distribution (i.e., to correspond to that shape) which is created by the larger pre-focusing structures described above. Unlike the plasmon generator structures of the prior art (e.g., K. Shimazawa and K. Tanaka, U.S. Pat. No. 8,000,178 B2, X. Jin et al. U.S. Pat. No. 8,599,656 B2), the OFE does not transport power, it simply acts to enhance the already existing optical fields (i.e., a "lightning rod" effect). Thus, its optical materials properties are not as important as they are for the plasmon generators in Jin et al., above and in Headway application Ser. No. 15/285,721. Finally, FIG. 3*e* shows an x-y planar cross-sectional view of the tapered waveguide core (50), showing its proximal maximum width denoted wWvg and its minimum distal width denoted wtWvg.

The design presented here is specifically meant to be used with mildly plasmonic materials. Its object is not just to replace good plasmonic metals by more stable metals in lifetime critical areas as, for example, in the Au—Rh bi-layer structure taught in Headway Ser. No. 15/011,892 where the Rh layer is present solely for structural stability and not for its plasmonic properties. We also note that the present design philosophy directed specifically at weakly plasmonic materials, still allows elements of the weakly plasmonic materials to be replaced by good plasmonic materials as long as they are away from regions where thermal effects can render them unstable. It should be realized that such a substitution would most likely trade improved performance for a more complicated structure process-wise.

We also note that the design presented herein allows for some flexibility in both the shape of the pole structure and the shape of the ABS aperture defined by the waveguide blocker. Referring now to FIG. 4a, there is shown a 3-dimensional illustration of an embodiment that is in most respects identical to what is shown in FIG. 1a but which differs from FIG. 1a in that a ridge 77 has been formed in the waveguide blocker (WVG) 70 by etching two notches, symmetrically about the center line, into the vertex of the WVG. The shape of the optical opening produced in this way differs from the C-shaped opening shown in FIG. 2c and looks more like a thick, horizontal capital letter I. FIG. 4b shows half of the ridge formation magnified. Referring to FIG. 4c, there is shown an ABS view of the full device in FIG. 4a. The two notches are shown as 78 and their combined effect is the single ridge 77. Note that the ridge 77 is directly beneath the peg 87 and has the same dimensions as the peg 87, which is approximately 20 nm in height (z-direction) and 60 nm in width (x-direction).

Figure 5:
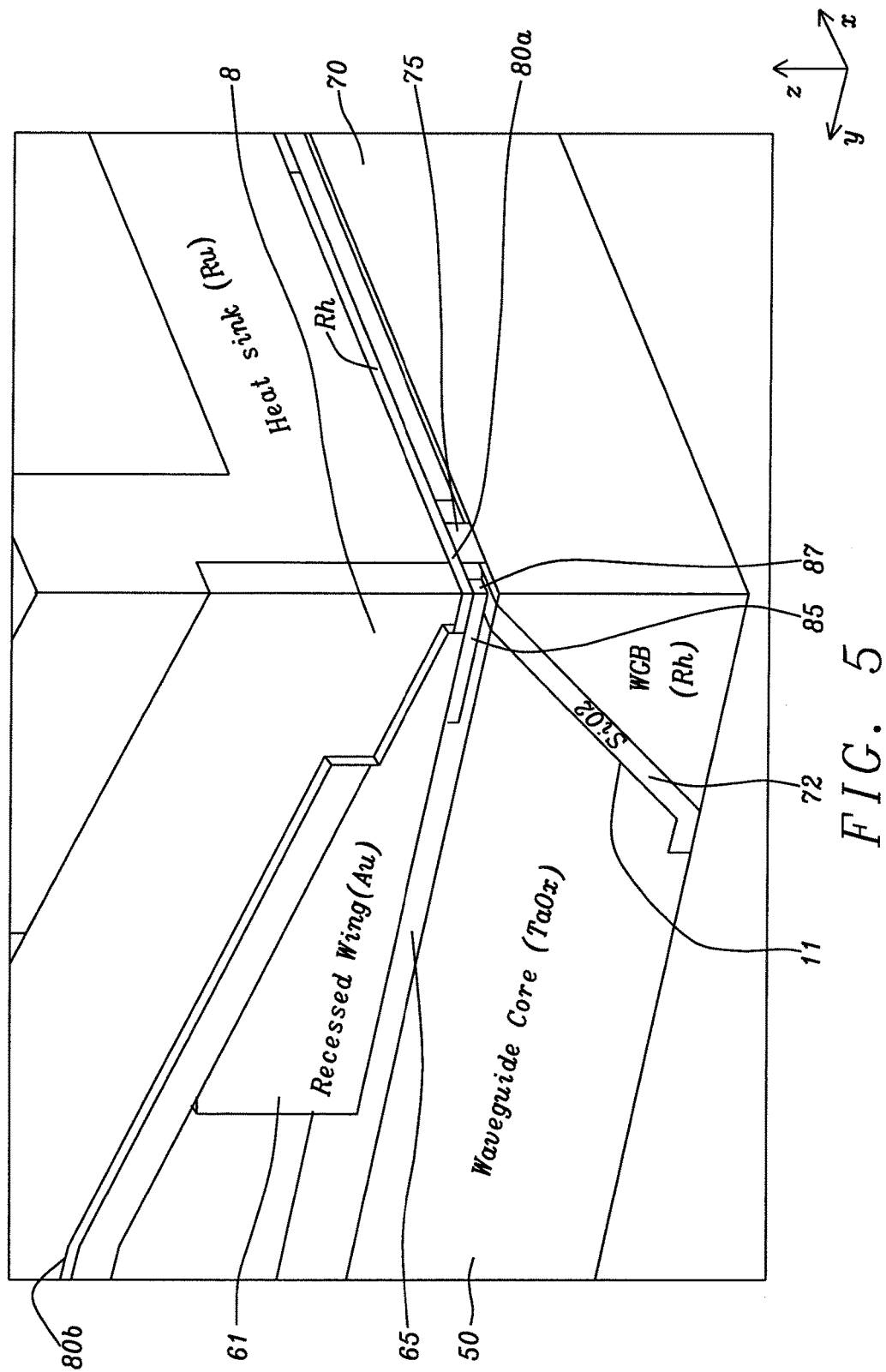
FIG. 5 is a 3-dimensional illustration of another embodiment showing the system in FIG. 1a being used with a differently shaped pole structure.

Referring now to FIG. 5, there is shown a design that is similar in most respects to what is shown in FIG. 1(a), but utilizes a downward-sloping main pole piece 8 and, correspondingly, a recessed Au wing 61 that has a triangular cross-section in the y-z plane. These design variations indicate the generality of the use of the weakly plasmonic elements and pre-focusing together with structural changes in the shape of the magnetic recording elements.

With respect to methods used in the formation of the claimed device, it is to be noted that the design was intentionally developed to accommodate to the prior art fabrication processes used in forming related devices (see, e.g., the various Headway docket numbers referenced above and fully incorporated herein) that were not specifically designed with weakly plasmonic materials in mind. Thus, we may model the present fabrication processes on those using highly plasmonic materials or poor or non-plasmonic materials and on those incorporating similar elements such as side shields or waveguide blockers that perform different functions because they are formed of different materials.

Revisions and modifications may be made to methods, materials, structures and dimensions employed in forming and providing a TAMR magnetic write head having weakly plasmonic materials that are structurally stable at the ABS, to which pre-focusing is applied to maintain efficiency and whereby plasmon modes are converted from surface plasmon polaritons to more narrowly confined surface plasmons and excited by a tapered waveguide abutted by a waveguide blocker and symmetrically flanked by optical side shields, while still forming and providing such a device and its method of formation in accord with the spirit and scope of the present disclosure as defined by the appended claims.

What is claimed is:

1. A TAMR (Thermally Assisted Magnetic Recording) write head comprising:
    a magnetic writer structure having a tapered main write pole section emerging at a distal ABS (Air-Bearing Surface) and configured to write on a magnetic recording medium when said magnetic recording medium has been properly activated thermally by plasmon near-field energy; and
    a structure comprising small, weakly plasmonic elements, wherein said elements are not subject to thermal deformations and recessions from said ABS yet are an efficient source of said plasmon near-field energy when excited by pre-focused optical energy provided by a system comprising:
    a waveguide, having a horizontally (x-y plane) tapered dielectric waveguide core, formed adjacent to and aligned along (y-direction) said main write pole and configured for directing pre-focused optical energy at a configuration of weakly plasmonic patterned layers comprising an upper layer and a lower layer; wherein
    a stratified, highly plasmonic film is formed between said waveguide and said tapered main pole and is separated from said main pole by a weakly plasmonic layer that extends distally to contact said upper layer of said configuration of weakly plasmonic patterned layers and wherein said stratified, highly plasmonic film is separated from said waveguide core by a dielectric layer, wherein a distal edge of said stratified, highly plasmonic film terminates at a distance from said ABS and is thereby recessed from said ABS; wherein
    said configuration of weakly plasmonic patterned layers formed between said distal edge of said stratified film and said ABS includes said upper layer and, beneath said upper layer is a lower layer contacting said upper layer and wherein said distal edge of said stratified highly plasmonic film contacts a proximal edge of said upper layer of said patterned configuration; wherein
    a downward sloping distal face of said waveguide conformally abuts a complementary sloped edge of a waveguide blocker formed of weakly plasmonic material; and wherein
    said downward sloping distal face of said waveguide is separated from said complementary sloped edge of said waveguide blocker by a uniform layer of dielectric material; and
    a pair of optical side shields formed of weakly plasmonic material is laterally and symmetrically disposed to either side of said waveguide, and wherein;
    said lower layer of said configuration of weakly plasmonic patterned layers is an optical field enhancer (OFE) with a distally emerging peg, said OFE having a patterned shape that coincides with a shape of said pre-focused electromagnetic field.

2. The TAMR write head of claim 1, wherein:
    said waveguide is configured to excite optical modes that excite surface plasmon polaritons (SPP) in an interface between said dielectric layer and said highly plasmonic stratified film by optical radiation; and
    wherein said SPP are adiabatically converted to surface plasmon modes that are more narrowly focused horizontally in a distal direction and direct near-field plasmon energy from said configuration of weakly plasmonic patterned layers at a recording area on a magnetic recording medium; and wherein;
    said optical side shields are configured to prevent loosely coupled radiative energy from said waveguide from being transferred to said recording medium and its surroundings and also to further support SPP excitation; whereby
    said optically generated near-field plasmon energy is directed at a narrowly confined region of a recording medium immediately adjacent to said ABS of said main write pole, within which narrowly confined region said near field energy produces Joule heating of said recording medium and thereby enables writing on said recording medium.

3. The TAMR write head of claim 2 wherein a gap between an inner edge of an OSS and an outer edge of said OFE is approximately 40 nm.

4. The TAMR write head of claim 2 wherein said peg extends approximately 20 nm in length along the y-direction and approximately 60 nm in width along the x-direction.

5. The TAMR write head of claim 2 wherein polarization of said waveguide optical mode is configured to excite a corresponding SPP mode.

6. The TAMR write head of claim 2 wherein polarization of said waveguide optical mode is perpendicular to the plane of said configuration of weakly plasmonic patterned layers.

7. The TAMR write head of claim 1 wherein said waveguide blocker is a triangular prism and is formed of any of the weakly plasmonic materials Rh, Ir, Pt, Pd or their composites.

8. The TAMR write head of claim 1 wherein said optical side shields are formed of any of the weakly plasmonic materials Rh, Ir, Pt, Pd or their composites.

9. The TAMR write head of claim 8 wherein said optical side shields are triangular prisms or trapezoidal prisms, said prisms having a first face that is coplanar with said ABS plane and a second face that extends rearward from said first face and makes an angle with a symmetry plane that provides a clearance between said second face and a periphery of said waveguide core.

10. The TAMR write head of claim 1 wherein said waveguide is tapered to a narrower width in an x-y plane, wherein said narrowing occurs in a direction towards said ABS.

11. The TAMR write head of claim 1 wherein said dielectric layer between said WGB and said waveguide core is formed of a dielectric material having a smaller refractive index than that of said core.

12. The TAMR write head of claim 1 wherein said waveguide core material is TaOx and said dielectric material between said stratified highly plasmonic layer and said waveguide core is SiO2, alumina or any of its composites.

13. The TAMR write head of claim 1 wherein said OFE comprises a single patterned layer chosen from the group of the mildly plasmonic materials including Rh, Ir, Pt, Pd or any of their composites.

14. The TAMR write head of claim 13 wherein said OFE is patterned to a shape that conforms approximately with the shape of said plasmon near field.

15. The TAMR write head of claim 14 wherein said OFE is approximately 200 nm in length along the y-direction and approximately 220 nm in width along the x-direction and is patterned to conform to the shape of the plasmon near field.

16. The TAMR write head of claim 15 wherein said OFE has a thickness in the z-direction of approximately 20 nm.

17. The TAMR write head of claim 1 wherein said tapered main write pole section is tapered from a maximum width proximally of approximately 600 nm to a minimum width distally of approximately 160 nm.

18. The TAMR write head of claim 1 wherein said upper layer of said pair of patterned weakly plasmonic layers is of thickness 20 nm in the z-direction.

19. The TAMR write head of claim 1 wherein the thickness of said dielectric layer between the sloping face of said WGB and said waveguide core is approximately 35 nm and wherein the angle between said sloping face and the vertical is approximately 45 degrees.

20. The TAMR write head of claim 1 including an additional ridge-like feature in the middle of said waveguide blocker changes an aperture shape through which plasmon near field energy emerges.

21. The TAMR write head of claim 1 wherein said main pole slopes downward in the −z direction and said stratified, highly plasmonic film conforms to said slope by being formed with a triangular cross-section.

22. A TAMR (Thermally Assisted Magnetic Recording) write head comprising:
a magnetic writer structure having a tapered main write pole section emerging at a distal ABS (Air-Bearing Surface) and configured to write on a magnetic recording medium when said magnetic recording medium has been properly activated thermally by plasmon near-field energy; and
a structure comprising small, weakly plasmonic elements close to said ABS, wherein said elements are Rh, Ir, Pt, Pd or their composites which are not subject to thermal deformations and recessions from said ABS yet are an efficient source of said plasmon near-field energy when excited by pre-focused optical energy;
wherein said structure further comprises the good plasmonic elements Au, Ag or Cu at positions further from said ABS where thermal deformations are less of a concern;
wherein said pre-focused optical energy is provided by a system comprising:
a waveguide, having a horizontally (x-y plane) tapered dielectric waveguide core, formed adjacent to and aligned along (y-direction) said main write pole and configured for directing pre-focused optical energy at a configuration of weakly plasmonic patterned layers comprising an upper layer and a lower layer; wherein
a stratified, highly plasmonic film is formed between said waveguide and said tapered main pole and is separated from said main pole by a weakly plasmonic layer that extends distally to contact said upper layer of said configuration of weakly plasmonic patterned layers and wherein said stratified, highly plasmonic film is separated from said waveguide core by a dielectric layer, wherein a distal edge of said stratified, highly plasmonic film terminates at a distance from said ABS and is thereby recessed from said ABS; wherein
said configuration of weakly plasmonic patterned layers formed between said distal edge of said stratified film and said ABS includes said upper layer and, beneath said upper layer is a lower layer contacting said upper layer and wherein said distal edge of said stratified highly plasmonic film contacts a proximal edge of said upper layer of said patterned configuration; wherein
a downward sloping distal face of said waveguide conformally abuts a complementary sloped edge of a waveguide blocker formed of weakly plasmonic material; and wherein
said downward sloping distal face of said waveguide is separated from said complementary sloped edge of said waveguide blocker by a uniform layer of dielectric material; and
a pair of optical side shields formed of weakly plasmonic material is laterally and symmetrically disposed to either side of said waveguide, and wherein;
said lower layer of said configuration of weakly plasmonic patterned layers is an optical field enhancer (OFE) with a distally emerging peg, said OFE having a patterned shape that coincides with a shape of said pre-focused electromagnetic field.

23. A method for forming a TAMR head, comprising:
providing a magnetic write head having a tapered main write pole terminating at an ABS (Air Bearing Surface); then forming a layered pre-focusing structure beneath said main write pole wherein said layered structure includes:
a tapered waveguide core having a sloped distal end;
a dielectric layer formed on said waveguide core;
a stratified highly plasmonic layer formed on said dielectric layer and terminating a distance from said ABS;
a bilayer formed of weakly plasmonic materials formed on said dielectric layer and separating a distal end of said stratified layer from said ABS, whereat pre-focused optical radiation is directed; wherein
a distal end of a lower layer of said bilayer forms a peg;
a waveguide blocker, formed of weakly plasmonic materials formed abutting said sloped distal end of said tapered waveguide core and separated from said waveguide core by a dielectric layer; and
optical side shields, formed of weakly plasmonic materials formed to either side of said waveguide and emerging at said ABS to either side of said peg.

* * * * *